United States Patent
Lim et al.

(10) Patent No.: US 9,048,517 B2
(45) Date of Patent: Jun. 2, 2015

(54) BATTERY COOLING DUCT

(71) Applicants: Hyundai Motor Company, Seoul (KR); Kia Motors Corporation, Seoul (KR)

(72) Inventors: Hae Kyu Lim, Gyeonggi-do (KR); Yoon Cheol Jeon, Gyeonggi-do (KR); Yong Jin Lee, Gyeonggi-do (KR); Jeong Hun Seo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 296 days.

(21) Appl. No.: 13/687,778

(22) Filed: Nov. 28, 2012

(65) Prior Publication Data

US 2014/0023892 A1    Jan. 23, 2014

(30) Foreign Application Priority Data

Jul. 18, 2012 (KR) .................. 10-2012-0078266

(51) Int. Cl.
| | |
|---|---|
| *H05K 7/20* | (2006.01) |
| *H01M 10/625* | (2014.01) |
| *H01M 10/6556* | (2014.01) |
| *H01M 10/6566* | (2014.01) |
| *H01M 10/663* | (2014.01) |
| *B60H 1/00* | (2006.01) |

(52) U.S. Cl.
CPC ...... *H01M 10/5016* (2013.01); *H01M 10/5057* (2013.01); *H01M 10/5073* (2013.01); *H01M 10/5095* (2013.01); *B60H 1/00564* (2013.01); *B60H 2001/003* (2013.01)

(58) Field of Classification Search
None
See application file for complete search history.

(56) References Cited

U.S. PATENT DOCUMENTS

| 2,247,326 A | * | 6/1941 | Ziemann .................. 55/496 |
| 3,026,224 A | * | 3/1962 | Rogers, Jr. ............... 428/167 |
| 7,688,582 B2 | * | 3/2010 | Fukazu et al. ........... 361/690 |

FOREIGN PATENT DOCUMENTS

| JP | 2006-188182 A | 7/2006 |
| JP | 2007-294290 A | 11/2007 |
| JP | 2008-062781 A | 3/2008 |
| JP | 2008-141945 A | 6/2008 |
| KR | 20-1998-0035836 U | 9/1998 |
| KR | 1998-035836 U | 9/1998 |
| KR | 10-2006-0124862 A | 12/2006 |
| KR | 10-2010-0001736 A | 1/2010 |

* cited by examiner

*Primary Examiner* — J. Allen Shriver, II
*Assistant Examiner* — Hilary L Johns
(74) *Attorney, Agent, or Firm* — Mintz Levin Cohn Ferris Glovsky and Popeo, P.C.; Peter F. Corless

(57) ABSTRACT

Disclosed herein is a battery cooling duct. The duct includes a suction portion disposed between a rear seat and a floor panel of a vehicle, an inlet of the suction portion fluidly communicating with an interior of the vehicle to suction interior air. An extension portion is formed by extending an outlet side of the suction portion to a rear of the vehicle, e.g. a trunk, between the rear seat and the floor panel, and defines a passageway configured to allow the interior air to pass therethrough. A discharge portion extends from an outlet of the extension portion to the rear of the vehicle, and discharges the interior air passed through the extension portion, through an outlet of the discharge portion to the battery of the vehicle.

6 Claims, 5 Drawing Sheets

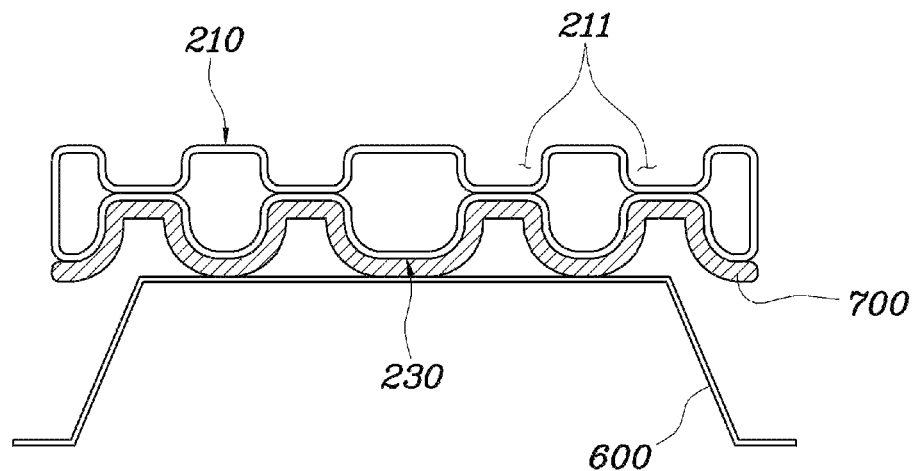
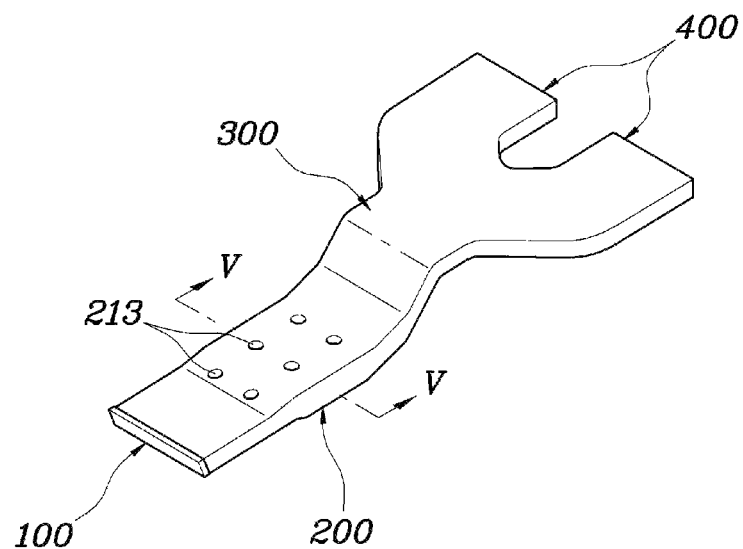

BATTERY COOLING DUCT

CROSS REFERENCE

This application claims under 35 U.S.C. §119(a) the benefit of Korean Application No. 10-2012-0078266 filed Jul. 18, 2012, the entire contents of which application is incorporated herein by reference.

BACKGROUND OF THE INVENTION

1. Field of the Invention

The present invention relates to a battery cooling duct, intended to cool high-voltage parts of environmentally friendly vehicles (e.g. a hybrid vehicles, an electric vehicles, and a fuel cell vehicles), such as a battery, an inverter, or a Low Voltage DC-to-DC Converter (LDC), using air from the interior of the vehicle.

2. Description of the Related Art

Since an environmentally friendly vehicle are often driven using a high-voltage battery (a hybrid vehicle, however, is driven using both an internal combustion engine and a battery) whereas conventional internal combustion engine vehicles are driven merely using mechanical force from a fuel powered engine, environmentally friendly vehicles are provided with a plurality of high-voltage parts. It is important to maintain a proper temperature because the performance of high-voltage parts, including the battery, varies depending on the temperature of the parts. Since high-voltage parts continuously generate heat when the vehicle is being operated, there is a risk that the parts will be damaged, broken and malfunction due to the overheating of the parts unless they are separately cooled.

Hence, a cooling system is mounted to allow the high-voltage parts to maintain the proper temperature and offer the highest degree of efficiency. Particularly, it is important to cool the battery because the vehicle is drive train is powered by the battery. Since the battery usually operates at an optimal efficiency at a temperature in the range of 20° C. to 40° C., it is important to maintain this temperature in order for the battery to maintain the highest possible degree of efficiency. However, when an air conditioning system is separately mounted on the vehicle, the architecture and configuration becomes more complicated, and incurs an additional cost on the part of the manufacture and indirectly on the customer.

The interior temperature of the vehicle is often times controlled by a occupant, and is kept within 20° C. to 40° C., which allows the vehicles occupants to maintain a certain level of comfort. Since the interior air of the vehicle is often maintained within a predetermined temperature range that is optimal for cooling the battery, a battery may be cooled using the interior air of the vehicle without any need for a separate air conditioning system.

Conventionally, the interior air of the vehicle is suctioned by a suction port of a cooling device sometimes located on a lower portion of the right or left sides of a rear seat within the vehicle, and is fluidly communicated along a passageway that extends to the battery. Since the passageway extends from the lower forward facing portion of through a central portion thereof to a location under the battery mounted under a trunk, the passageway typically contains an angled portion which causes an increase in pressure loss and a decrease in efficiency One option is to dispose the duct between the rear seat and a floor panel. A cover configured to prevent damage to the duct is mounted on an upper surface of the duct in this embodiment. However, in this design, although the passageway is simpler than the conventional duct, the number of assembly processes required to install the duct is increased and additional costs are incurred because of the required protective cover.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and an object of the present invention is to provide a battery cooling duct, which is configured to form a passageway that is substantially straight and shortened, unlike a conventional passageway that is formed to be long and may include a plurality of angles, thus preventing pressure loss from occurring due to surface collisions with flowing air (thereby causing a frictional loss). The present invention also prevents the passageway from being damaged, deformed or blocked due to external shock or the like, thus improving cooling efficiency as compared with the related art.

In order to accomplish the above object, the present invention discloses a battery cooling duct, including a suction portion disposed between a rear seat and a floor panel of a vehicle, an inlet of the suction portion fluidly communicating with an interior of the vehicle to suction interior air therein; an extension portion formed by extending an outlet side of the suction portion to the rear of the vehicle between the rear seat and the floor panel, the extension portion defining a passageway which is configured to allow the interior air to pass therethrough; and a discharge portion extending from an outlet side of the extension portion to the rear of the vehicle, the discharge portion discharging the interior air, which has passed through the extension portion, and through an outlet of the discharge portion to the battery of the vehicle. The outlet of the discharge portion may be directly coupled to a battery housing. A region located the suction portion to the discharge portion may be disposed under a portion substantially the center of the rear seat of the vehicle.

The battery cooling duct may further include a pad disposed on a bottom surface between the suction portion and the discharge portion, the pad may be configured to absorb shock transmitted from the rear seat. The discharge portion may also include a plurality of ducts branching off from the outlet side of the extension portion.

The battery cooling duct may further include a forming portion depressed in an upper surface of the extension portion in a longitudinal direction thereof, the forming portion including a plurality of additional forming portions arranged in a parallel orientation to each other. The upper surface and a lower surface of the extension portion may be formed into a corresponding shape providing contact between the depressed portions of the forming portions, thus supporting a load transmitted from the rear seat.

The battery cooling duct may further include a groove depressed in the upper surface of the extension portion in a longitudinal direction thereof, the groove including a plurality of additional grooves arranged in a parallel orientation to each other. The plurality of grooves may be arranged in a zigzag pattern. The lower surface of the extension portion may include an irregular surface in contact with an end of each of the grooves, thus supporting a load transmitted from the rear seat.

The battery cooling duct may further include a bushing extending from the upper surface to the lower surface of the extension portion, the bushing including a plurality of additional bushings arranged in a parallel orientation to each other in a longitudinal direction of the extension portion. The plurality of bushings may also be arranged in a zigzag pattern. The lower surface of the extension portion may include an irregular surface in contact with an end of each of the bushings, thus supporting a load transmitted from the rear seat.

The battery cooling duct may further include a plurality of ribs arranged parallel to each other in a longitudinal direction thereof between the upper surface and the lower surface of the extension portion. The lower surface of the extension portion may include an irregular surface in contact with an end of each of the ribs, thus supporting a load transmitted from the rear seat.

BRIEF DESCRIPTION OF THE DRAWINGS

The above and other objects, features and advantages of the present invention will be more clearly understood from the following detailed description taken in conjunction with the accompanying drawings, in which:

FIG. 3 is a cross-sectional view taken along line III-III of FIG. 2;

FIG. 4 is an exemplary view illustrating the battery cooling duct including a plurality of grooves according to an exemplary embodiment of the present invention;

DESCRIPTION OF PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, a battery cooling duct according to the preferred embodiment of the present invention will be described with reference to the accompanying drawings.

Figure 1:
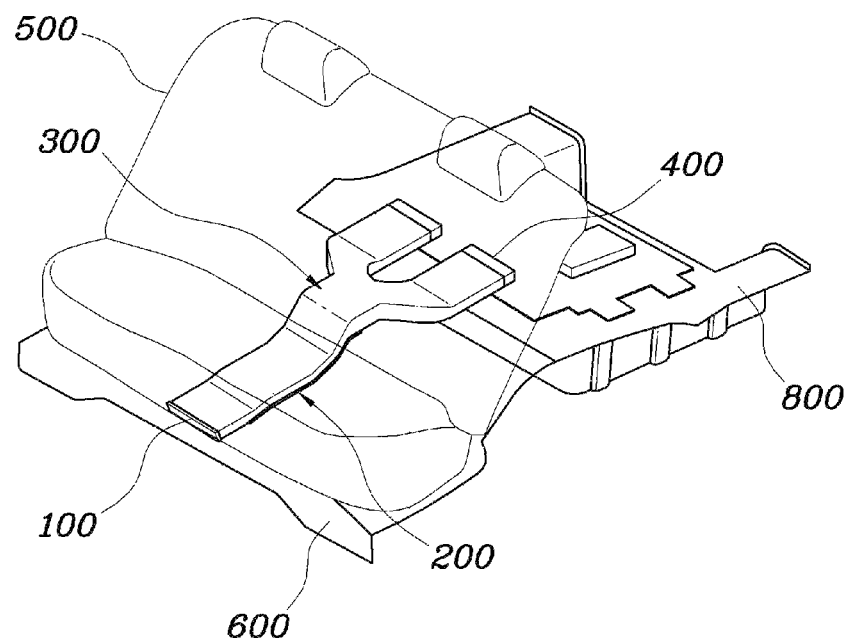
FIG. 1 is an exemplary view illustrating a mounted battery cooling duct according to an exemplary embodiment of the present invention.

As shown in FIG. 1, the battery cooling duct of the present invention includes a suction portion 100, an extension portion 200 and a discharge portion 400. The suction portion 100 is disposed between a rear seat 500 and a floor panel 600 of a vehicle so that the suction portion is substantially in the center of the rear seat 500, and an inlet of the suction portion 100 fluidly communicating with the interior air of the vehicle. The suction portion 100, provided between the rear seat 500 and the floor panel 600 of the vehicle, extends towards the battery located in a rear portion of the vehicle, e.g. a trunk, thus defining the extension portion 200. The discharge portion 400 extends from an outlet side of the extension portion 200 towards the battery located in the rear of the vehicle, and an outlet of the discharge portion 400 is directly coupled to a battery housing 800 of the vehicle.

As shown in FIG. 1, an air passageway (fluid flow) is formed via the illustrative air duct of the present invention so that the interior air of the vehicle is suctioned into the suction portion 100 due to exposure to the interior of the vehicle. This interior air is suctioned into the suction portion 100, passes through the extension portion 200, and is then discharged through the outlet of the discharge portion 400 into the battery housing. The air suctioned from the interior of the vehicle discharged into the battery housing travels along a significantly straight or linear passageway there is a significant decrease is pressure reduction.

The discharge portion 400 may include a plurality of ducts branching off from the outlet side of the extension portion 200. Such a configuration increases an air discharge area, thus enabling the battery to be cooled more uniformly and efficiently.

Typically, a floor panel 600 of the vehicle is made of a material that is different from that of the battery cooling duct, such as metal or strong different type of resin. Thus, when the vehicle is being operated, friction, noise or shock may occur between the floor panel 600 and the battery cooling duct. Further, when a passenger sits on the rear seat 500, a load is transmitted downwards, creating pressure that is transmitted to the battery cooling duct. When the applied pressure exceeds the permissible limit, the battery cooling duct may be broken or damaged.

In order to solve the problems, a pad 700 is provided in the exemplary embodiment of the present invention between a lower portion of a region extending from the suction portion 100 to the discharge portion 400 and the floor panel 600. The pad 700 prevents friction, noise and shock from occurring when the vehicle is driven as described above, in addition to preventing the battery cooling duct from being broken due to the pressure caused by passenger load.

Further, when the passenger load exceeding the permissible limit on the extension portion 200 is transmitted from the rear seat 500, the extension portion 200 may be deformed or broken and consequently the passageway followed by the suctioned interior air may be blocked/obstructed. Thus, the load support performance of the extension portion 200 is secured by several methods that will be described below.

Figure 2:
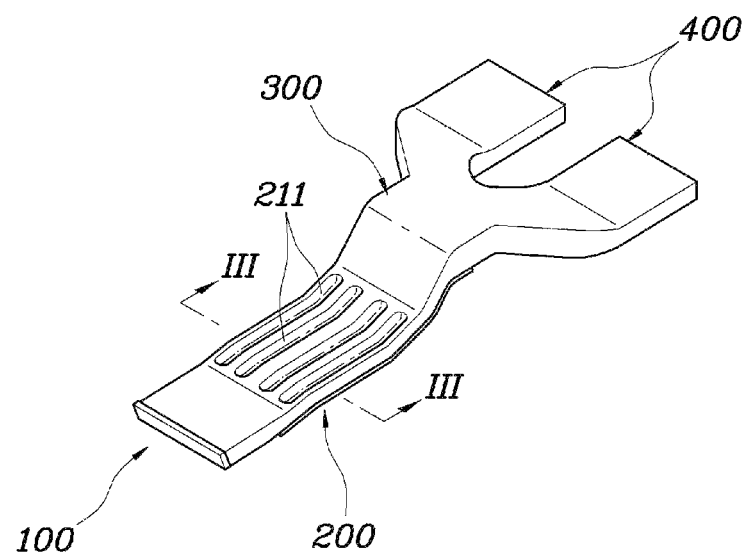
FIG. 2 is an exemplary view illustrating the battery cooling duct including a plurality of forming portions according to an exemplary embodiment of the present invention.

FIGS. 2 and 3 illustrate a plurality of forming portions 211 that is depressed in the extension portion 200 in a longitudinal direction of an upper surface 210 of the extension portion 200, and FIG. 3 is a cross-sectional view taken along line III-III of FIG. 2. As shown in FIG. 2, the plurality of forming portions 211 are arranged in parallel. Further, the forming portions 211 depressed in the upper surface 210 of the extension portion 200 correspond to the forming portions 211 depressed in a lower surface 230 of the extension portion 200, creating contact between the depressed portions. The forming portions 211 of the upper surface 210 of the extension portion 200 are configured to support the load transmitted from the rear seat 500 by creating contact with the forming portions 211 of the lower surface 230. Such a configuration is advantageous because it secures the rigidity of the extension portion 200.

Figure 5:
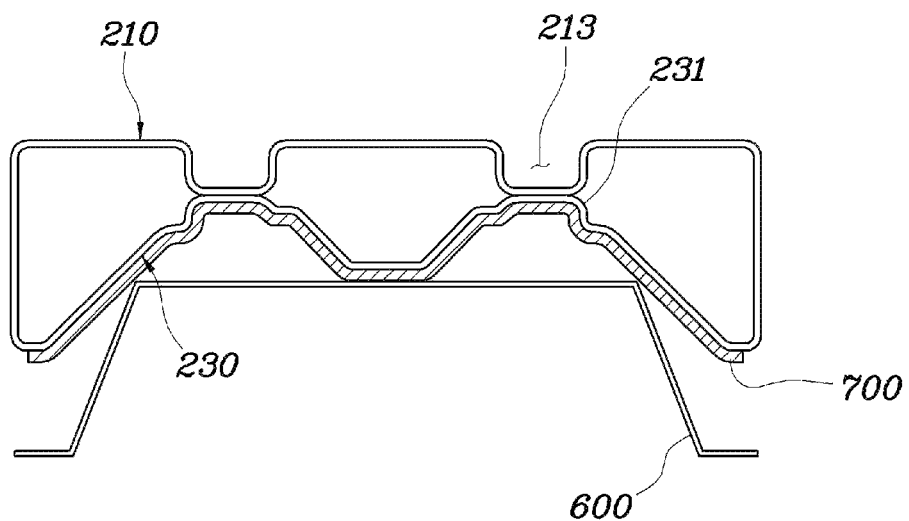
FIG. 5 is a cross-sectional view taken along line V-V of FIG. 4.

FIGS. 4 and 5 illustrate a plurality of grooves 213 depressed in the upper surface 210 of the extension portion 200, and FIG. 5 is a cross-sectional view taken along line V-V of FIG. 4. As shown in FIG. 4, the plurality of grooves 213 may be arranged in a parallel orientation to each other in a longitudinal direction of the extension portion 200. The grooves project inwards from the perimeter of the upper surface, e.g. in a concave manner. The grooves 213 may be arranged in a zigzag pattern. Such an arrangement prevents the suctioned air from colliding with the side of each groove 213, thus avoiding turbulence and enabling uniform air flow, preventing the air flow path from being blocked by the grooves 213, and thus preventing air pressure reduction.

Further, as shown in the FIG. 5, irregular surfaces 231 are formed on the lower surface 230 of the extension portion 200, in contact between the irregular surfaces 231 and the ends of the grooves 213 depressed in the upper surface 210 of the extension portion 200. The grooves 213 of the upper surface 210 of the extension portion 200 are in contact with the irregular surfaces 231 of the lower surface 230, thus providing a support for the load transmitted from the rear seat 500. Such a configuration is advantageous because it secures the rigidity of the extension portion 200. The irregular surfaces 231 of the lower surface 230 of the extension portion 200 may be formed along the floor panel 600 of the vehicle.

As described above, the grooves 213 may be formed on the lower surface 230 of the extension portion 200, similarly to the upper surface 210 of the extension portion 200. The embodiment of FIG. 5 includes the irregular surfaces 231.

Figure 6:
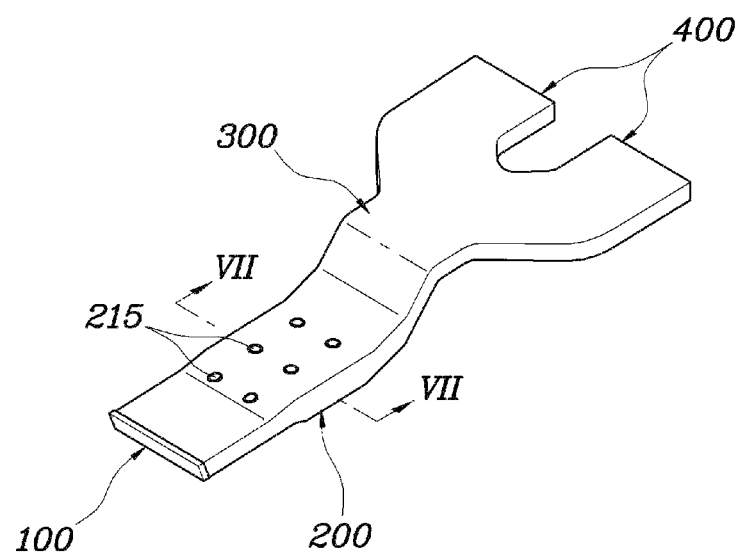
FIG. 6 is an exemplary view illustrating the battery cooling duct including a plurality of bushings according to an exemplary embodiment of the present invention.
Figure 7:
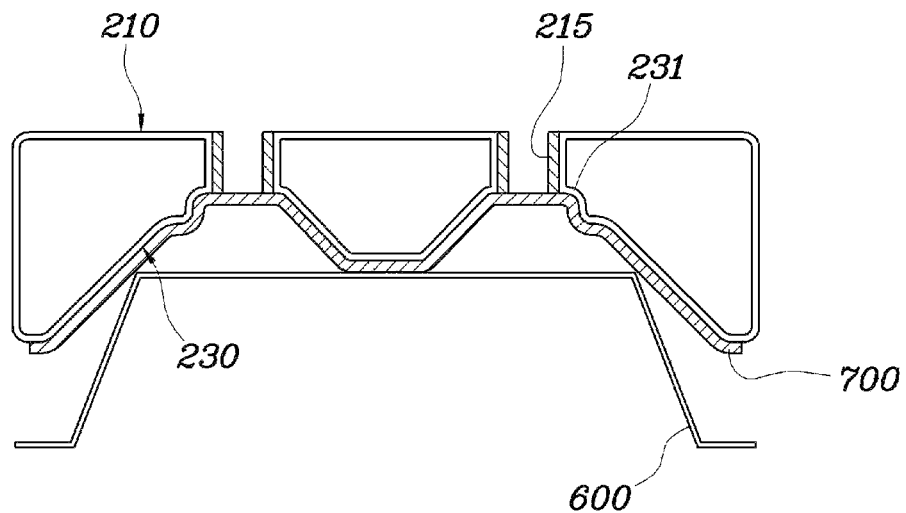
FIG. 7 is a cross-sectional view taken along line VII-VII of FIG. 6.

FIGS. 6 and 7 illustrate a plurality of bushings 215 that extend from the upper surface 210 of the extension portion 200 to the lower surface 230 of the extension portion 200, and FIG. 7 is a cross-sectional view taken along line VII-VII of FIG. 6. As shown in FIG. 6, the plurality of bushings 215 is arranged in a parallel orientation to each other in the longitudinal direction of the extension portion 200. Further, the bushings 215 may be arranged in a zigzag pattern. Such an arrangement prevents the suctioned air from colliding with the side of each bushing 215, thus avoiding turbulence and enabling uniform air flow, preventing the passageway followed by the suctioned air from being blocked by the bushings 215, and thus preventing the pressure of the suctioned air from decreasing.

Further, as shown in the drawing, the irregular surfaces 231 are formed on the lower surface 230 of the extension portion 200, creating contact between the irregular surfaces 231 and the ends of the bushings 215. The bushings 215 create contact with the irregular surfaces 231 of the lower surface 230 of the extension portion 200, thus providing a support for the load transmitted from the rear seat 500. Such a configuration is advantageous because it secures the rigidity of the extension portion 200. The irregular surfaces 231 of the lower surface 230 of the extension portion 200 may be formed along the floor panel 600 of the vehicle.

Figure 8:
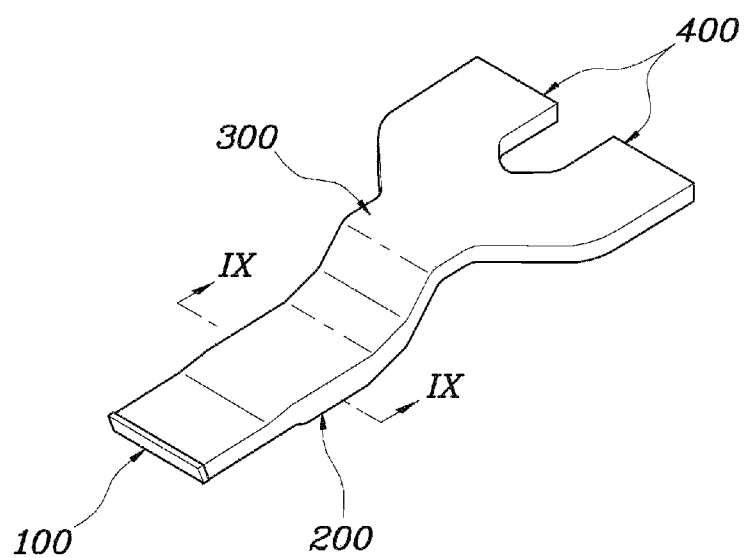
FIG. 8 is an exemplary view illustrating the battery cooling duct including a plurality of ribs according to an exemplary embodiment of the present invention.
Figure 9:
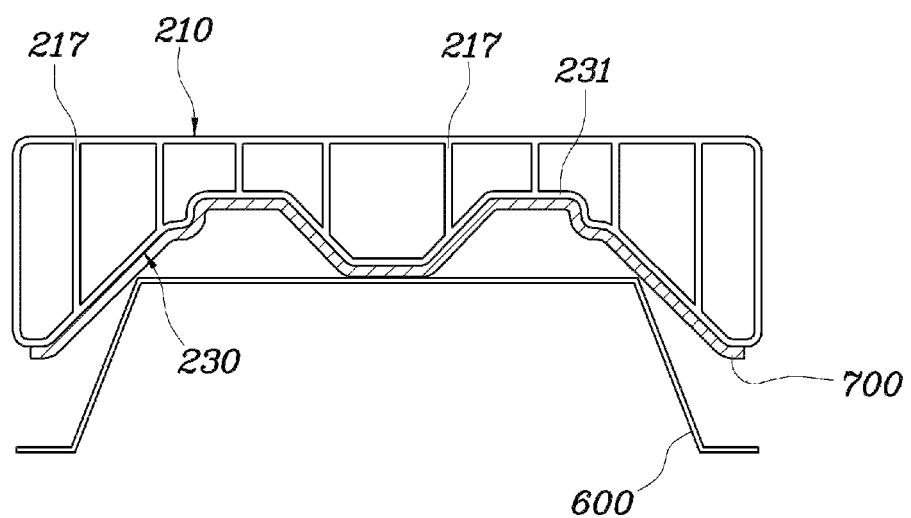
FIG. 9 is a cross-sectional view taken along line IX-IX of FIG. 8.

FIGS. 8 and 9 illustrate a plurality of ribs 217 that is disposed between the upper surface 210 and the lower surface 230 of the extension portion 200 in a parallel orientation to each other in the longitudinal direction of the extension portion 200, and FIG. 9 is a cross-sectional view taken along line IX-IX of FIG. 8. The ribs project outwardly from the perimeter of the lower surface as elongated projections. As shown in FIG. 8, the irregular surfaces 231 are formed on the lower surface 230 of the extension portion 200, creating contact between the irregular surfaces 231 and ends of the ribs 217. The ribs 217 and the irregular surfaces 231 provide a support for the load transmitted from the rear seat 500. Such a configuration is advantageous because it secures the rigidity of the extension portion 200. The irregular surfaces 231 of the lower surface 230 of the extension portion 200 may be formed along the floor panel 600 of the vehicle.

The conventional battery cooling duct extends from a lower side of the rear seat 500 of the vehicle to the battery located at the rear of the vehicle, forming a substantially lengthened and angled passageway. Hence, the pressure from the interior air of the vehicle is reduced as the air travels through the substantially lengthened and angled passageway.

In contrast, according to the present invention, since the battery cooling duct extends from a center lower portion of the rear seat 500 of the vehicle to the rear of the vehicle, a substantially straight and shortened passageway is formed, allowing the suctioned air to flow smoothly therein and reducing the pressure loss that occurs in the conventional battery cooling duct. Since the pressure loss of the air is reduced f, the capacity of the cooling fan may be reduced. The reduction in capacity of the cooling fan causes a reduction in noise and cost.

Further, the above-mentioned reinforcing structures are configured to support the load transmitted from the rear seat 500, so that it is possible to reliably realize proper performance.

As described above, the present invention includes a battery cooling duct for a vehicle, forming a substantially straight and shortened passageway effective in reducing pressure loss of air suctioned from an interior of the vehicle, in comparison with a conventional battery cooling duct that is formed at an angle and long. Since the pressure loss of the air is reduced owing to the simplification of the passageway, the capacity of a cooling fan may be reduced as well, and the effect of reducing noise and cost is realized due to the reduction in capacity.

Further, the present invention includes a battery cooling duct, configured to reinforce the cooling duct using an extension portion in place of using a conventional protective cover to prevent damage to the battery cooling duct, thus reducing the amount of material, the number of processes, and the manufacturing cost. Therefore, the present invention provides a battery cooling duct, including an increased cooling efficiency as compared with the conventional battery cooling duct.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A battery cooling duct, comprising:
a suction portion disposed between a rear seat and a floor panel of a vehicle, an inlet of the suction portion exposed to an interior of the vehicle to suction interior air therein;
an extension portion extended between an outlet side of the suction portion and a rear of the vehicle between the rear seat and the floor panel, the extension portion defining a passageway configured to allow the interior air to pass therethrough;

a discharge portion extending from an outlet of the extension portion to the rear of the vehicle, the discharge portion discharging the interior air through an outlet of the discharge portion and into the battery housing of the vehicle; and a plurality of additional ribs disposed between the upper surface and the lower surface of the extension portion in a parallel orientation to each other in a longitudinal direction thereof.

2. The battery cooling duct as set forth in claim 1, wherein the outlet of the discharge portion is directly coupled to the battery housing.

3. The battery cooling duct as set forth in claim 1, wherein a region from the suction portion to the discharge portion is disposed under substantially the center of the rear seat of the vehicle.

4. The battery cooling duct as set forth in claim 1, further including: a pad disposed on a bottom surface between the suction portion and the discharge portion, the pad configured to absorb shock transmitted from the rear seat.

5. The battery cooling duct as set forth in claim 1, wherein the discharge portion includes a plurality of ducts branching off from the outlet side of the extension portion.

6. The battery cooling duct as set forth in claim 1, wherein the lower surface of the extension portion includes an irregular surface in contact with an end of each of the ribs.

* * * * *